No. 835,918. PATENTED NOV. 13, 1906.
A. SABROE.
MILKING MACHINE WITH ELECTROMAGNETIC CLOSING DEVICE.
APPLICATION FILED FEB. 1, 1906.
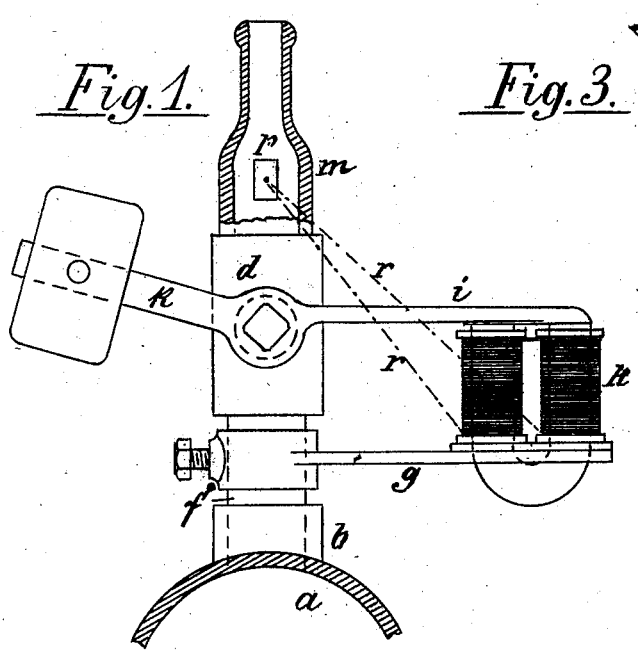
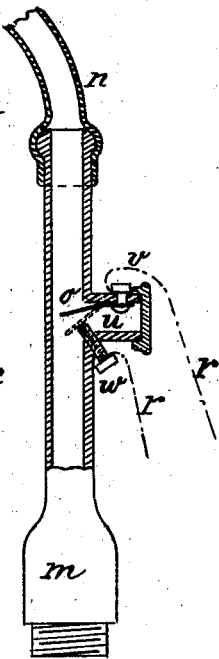
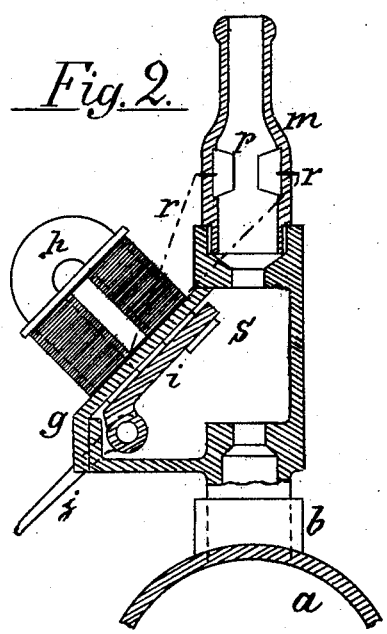
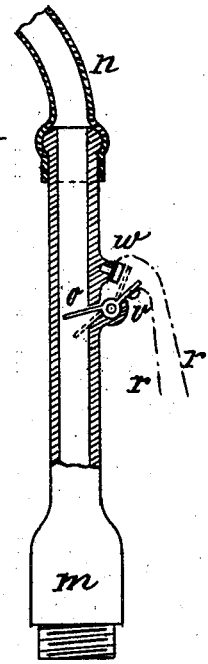

UNITED STATES PATENT OFFICE.

AXEL SABROE, OF AASTRUP, GERMANY.

MILKING-MACHINE WITH ELECTROMAGNETIC CLOSING DEVICE.

No. 835,918.  Specification of Letters Patent.  Patented Nov. 13, 1906.

Application filed February 1, 1906. Serial No. 298,975.

*To all whom it may concern:*

Be it known that I, AXEL SABROE, a subject of the Emperor of Germany, residing at Aastrup, Germany, have invented certain new and useful Improvements in Milking-Machines with Electromagnetic Closing Devices, of which the following is a full, clear, and exact specification.

In milking-machines floats have been employed to close the opening admitting the milk into the collecting vessels as soon as the milk rises to a certain level in the same or as soon as the supply of milk ceases, said float being connected by means of a lever with the contact of an electric circuit inclosing a magnet. When any of the parts of such closing-device levers or circuit for the magnet fails to operate, the suction in the conduit leading to the teat of the animal will continue, and this is very injurious for the animals when the milk in the bag is exhausted. By the present invention the arrangement is such that every individual conduit for the milk is immediately and positively closed by a device operated electromagnetically as soon as the flow of milk slakens or ceases, so that the animals are most positively safeguarded against an injurious suction on a teat being exhausted.

In the accompanying drawings different examples of the invention are illustrated—*i. e.*, the flow of milk itself may close the current for the magnet or the contacts for the circuit are brought together by the weight of the passing milk, and in this latter case a weaker current may be employed, while in the former case a more powerful current is necessary, as it is considerably weakened when it has to pass through the milk.

Figure 1 is a side view of the device with parts broken away to show the contact-plate. Figs. 2, 3, and 4 are modifications.

The air-tube $a$ is provided with branches $b$ for the different suction-pipes. The cock $d$, Fig. 1, is connected with the branch $b$ by a short piece of pipe $f$, carrying the support $g$ for an electromagnet $h$. The plug of the cock $d$ is provided with a double-armed lever, of which one arm carries the armature $i$ for the electromagnet, while the other arm $k$ carries a weight as counterbalance. $m$ is a mouthpiece made of insulating material and being inserted into the body of cock $d$. Said mouthpiece is connected with the flexible conduit $n$, leading to the teat. The mouthpiece $m$ is also provided in its interior with the contact-pieces $p$, being connected by wires $r$ with the electromagnet $h$.

In Fig. 2 a valve-casing $s$ is employed instead of the cock $d$, Fig. 1. This casing is provided with a pivoted valve-plate $i$, having an arm or handle $j$, extending outward. The cover $y$ of the valve-casing $s$ carries the electromagnet $h$ in such a way that the valve-plate $i$ forms its armature and holds the same in open position as long as the electromagnet is energized. This electromagnet $h$ is also connected with contact-bodies $p$ in the conduit by means of wires $r$.

According to Figs. 3 and 4, a contact-plate is extended into the pneumatic conduit in such a way that by the aspiration alone it is not moved. However, when the milk commences to flow the contact-plate is pressed by its weight against another contact, so as to produce a circulation of an electric current through the electromagnet. Fig. 3 shows the contact-plate $o$ secured in a lateral chamber $u$ of the conduit. A binding-post $v$ connects said contact-plate with the electromagnet by one of the wires $r$. The second binding-post $w$, to which the other wire $r$ is secured, is so near to the contact-plate $o$ that the latter under the weight of the flowing milk can be pressed down against it. Thus the current for the electromagnet will remain closed as long as the milk flows. Fig. 4 shows a contact-plate $o$, which is pivoted and reaches into the conduit. An extension of said contact-plate carries outside one binding-post $v$, and the other binding-post $w$ is stationary, but within range of the pivoted plate $o$. Here also the current will be closed and will remain closed as soon as the flow of milk commences and continues.

In the device Fig. 2 it is necessary to lift the valve-plate $i$ by means of its extension $j$ at the beginning of the operation against the electromagnet. The air-suction will act immediately on the teat, and the rich current of milk passing between the contacts $p$ will allow the passage of the electric current, so that the electromagnet will hold the armature $i$ in the open position as long as the milk continues to flow and as long as the current can pass through the milk from one of the contact-bodies $p$ to the other. When the teat begins to be exhausted and the current cannot find any longer a passage from one contact-plate to the other, owing to the weak current of milk, the valve-plate will be released and drop into a position to close off the air-suction. The same effect is obtained by the device Fig. 1. for when the electromagnet is no more energized a counterbalance-weight on the arm $k$ will act to close the cock and so cut off the suction from the teat.

Having thus described my invention, what I claim is—

1. In a milking-machine with electromagnetic closing device an electromagnet, an armature for the same, holding the passage of the milk open while the electromagnet is energized, and adapted to close said passage at its release, and contact-plates connected to said electromagnet and placed within the passage of the milk, adapted to permit the circulation of the electric current by the flow of the milk, substantially as described.

2. In a milking-machine with electromagnetic closing device, an electromagnet, an armature $i$ for the same, governing a stop-cock, and holding the passage of the milk open while the electromagnet is energized, and adapted to close said passage at its release, and contact-plates connected to said electromagnet and placed within the passage of the milk, adapted to permit the circulation of the electric current by the flow of the milk, substantially as described.

3. In a milking-machine with electromagnetic closing device an electromagnet, an armature $i$ in a chamber within the milk-conduit holding the passage of the milk open while the electromagnet is energized, and adapted to close said passage at its release and contact-plates connected to said electromagnet and placed within the passage of the milk adapted to permit the circulation of the electric current by the flow of the milk substantially as described.

In testimony whereof I affix my signature.

AXEL SABROE.

In presence of—
   JULIUS RÖPKE,
   OTTO LAU.